Aug. 10, 1965         D. H. SILVERN         3,200,051
         ROTARY EVAPORATOR-CONDENSER APPARATUS
               FOR THIN FILM DISTILLATION
Filed Sept. 14, 1961                    2 Sheets-Sheet 1
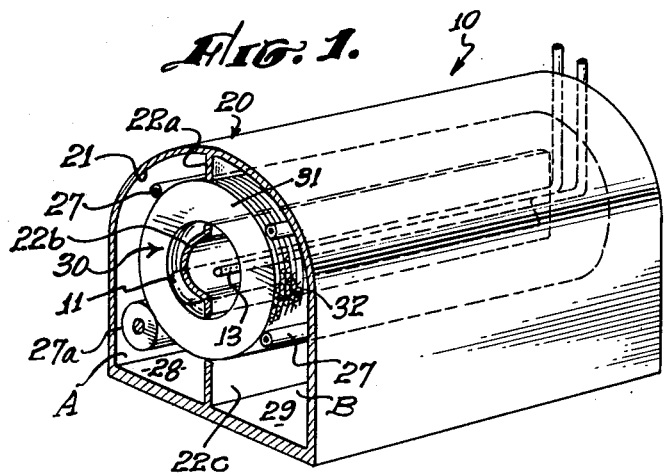
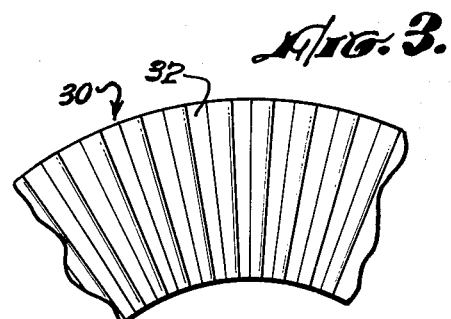
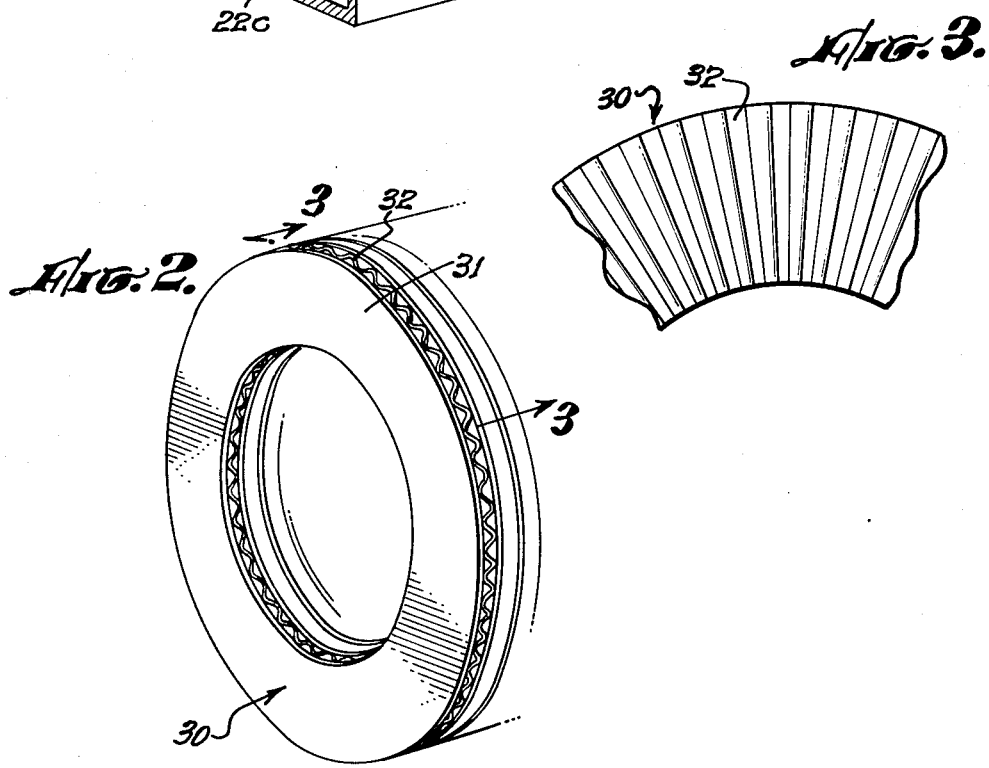
DAVID H. SILVERN,
INVENTOR.
BY HIS ATTORNEYS.
Spensley & Horn.

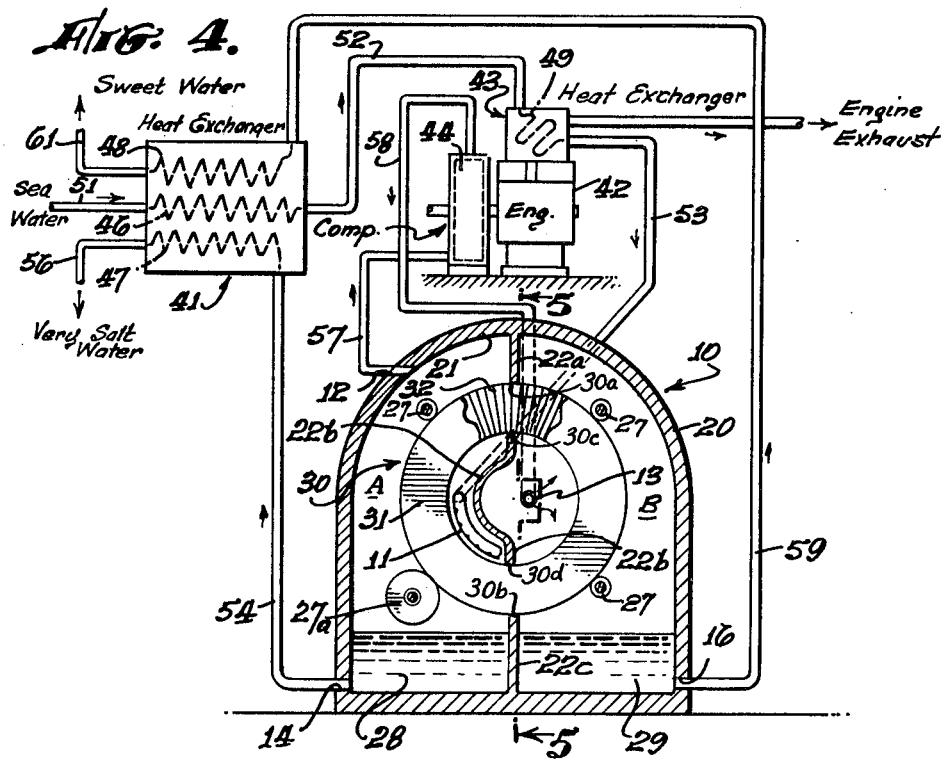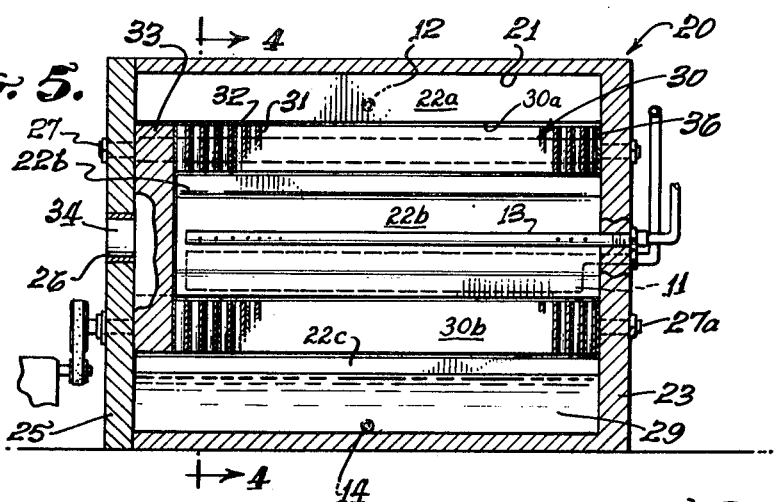

United States Patent Office 3,200,051
Patented Aug. 10, 1965

3,200,051
ROTARY EVAPORATOR-CONDENSER APPARATUS FOR THIN FILM DISTILLATION
David H. Silvern, North Hollywood, Calif.
(207 Carolina, Olean, N.Y.)
Filed Sept. 14, 1961, Ser. No. 138,026
9 Claims. (Cl. 202—236)

This invention relates to the distillation of liquids and more particularly to apparatus especially applicable to the distillation of salt water.

The efficient conversion of salt water to sweet water is becoming increasingly important as an aid in fulfilling the water supply requirements of a growing population. Various methods and apparatus have been devised for the conversion of salt water to sweet water to render it fit for human consumption. Among the methods now undergoing development is conversion by evaporation and re-condensation. However, at the present state of the art, this apparatus is generally complex and bulky, necessitating a multiplicity of pipes and headers and requiring a large heat transfer area for the evaporation of salt water. A significant reduction in the size and complexity of salt water conversion apparatus, together with an increase in operating efficiency, will result in a desirable lowering of overall costs.

Accordingly, it is an object of the present invention to provide improved apparatus for the distillation of liquids.

It is another object of the present invention to provide relatively compact and inexpensive apparatus for the distillation of liquids.

It is a further object of the present invention to provide improved apparatus for the conversion of salt water to sweet water.

It is yet another object of the present invention to provide a combination evaporator-condenser apparatus particularly suitable for use in a salt water conversion system.

It is also an object of the present invention to provide an evaporator-condenser apparatus which is economical to construct and efficient and economical in operation.

It is a still further object of the present invention to provide an improved salt water conversion system.

The objects of the present invention are accomplished by improved apparatus for distilling liquids, which apparatus includes a rotary evaporator-condenser generally comprising a housing divided by a partitioning wall into two chambers. Rotatably mounted in the partitioning wall is a cylindrical tubular rotor consisting of a series of spaced annular fins disposed in coaxial alignment and defining a multiplicity of radially extending openings between adjacent fins, the rotor being rotated about its principal axis with semi-cylindrical portions thereof extending into both chambers of the housing. In one chamber of the housing (designated as chamber A) evaporation of distilland occurs, while in the other chamber (designated as chamber B) vapor condensation occurs. For the conversion of salt water to sweet water, for example, chamber A is maintained at approximately atmospheric pressure and salt water is sprayed onto the radially extending fins of the rotating tubular rotor, within this chamber, the salt water being introduced at approximately its boiling point of 212° F. The fins of the rotor are maintained at a temperature of about 217° F. such that the salt water impinged thereon is vaporized. That portion of the water which fails to vaporize is thrown from the fins by centrifugal force and collects in a sump at the bottom of the chamber A while the vapor formed is removed from the chamber and compressed to thereby raise its temperature to a temperature above that of the rotor fins. The resulting superheated vapor is then injected into the chamber B of the housing and impinged upon the fins rotating therethrough to maintain the fins at the predetermined temperature lower than the superheat temperature. The hotter vapor striking the cooler fins condenses as sweet water and is collected in a sump at the bottom of the chamber B. The fins are rotated at a sufficient speed to maintain a thin film upon the fins to prevent admixing of the liquids in each of the chambers and to provide a highly efficient heat transfer from the fins to the film.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a perspective view, partially cut away, of the evaporator-condenser unit of the present invention, the sectioned portion being taken along the line 4—4 of FIGURE 5;

FIGURE 2 is a partial perspective view of the cylindrical tubular rotor cut away along the line 4—4 of FIGURE 5;

FIGURE 3 is a partial view taken along the line 3—3 of FIGURE 2;

FIGURE 4 is a partially schematic diagram of a salt water conversion system including a sectional view of the evaporator-condenser unit taken along the line 4—4 of FIGURE 5; and, FIGURE 5 is a sectional view, in elevation, of the evaporator-condenser unit taken along the line 5—5 of FIGURE 4.

Turning now to the drawing, in FIGURES 1 and 5 thereof, and in a portion of FIGURE 4, there are shown various views of a presently preferred embodiment of the rotary evaporator-condenser unit of the present invention. This evaporator-condenser unit is generally indicated by the reference numeral 10. The basic components of the evaporator-condenser unit 10 are a housing 20 and a cylindrical rotor assembly 30. The housing 20 is of generally rectangular configuration with a semi-cylindrical top surface 21 for accommodation of the cylindrical rotor 30. The housing 20 is divided into two chambers by a vertical partition 22 which bisects the curved top surface 21. As shown on the drawing, one of the chambers is designated by the reference figure A, and the other chamber is designated by the reference figure B. Slots are provided in the partition 22 and are horizontal and spaced apart a predetermined distance to allow the cylindrical rotor 30 to be fitted therein in a manner to be hereinafter explained. The slots effectively divide the partition 22 into upper, intermediate and lower horizontal sections, designated respectively 22a, 22b and 22c. One end of the housing 20 is sealed by an integral endplate 23, and the other end is sealed by a removable endplate 25.

Referring now specifically to FIGURES 2, 3 and 5 of the drawing, rotor unit 30 is of a cylindrical tubular shape and is formed by an assemblage of annular plates 31 separated by corrugated annular spacing elements 32. The corrugations in the spacing elements 32 form a multiplicity of radially extending passageways between adjacent plates 31. At one end of the cylindrical rotor 30 is a thick endplate 33 including an integral centered stub shaft 34 (see FIGURE 5). At the other end of the cylindrical rotor 30 is an annular endplate 36 of similar shape to the plates 31 but thicker than the plate 31 to provide greater structural rigidity. As can best be seen from FIGURES 1 and 4, the cylindrical rotor 30 is disposed within the housing 20, fitting within the slots in the partition 22 and with the central section 22b of the partition 22 extending into the central cylindrical opening of the rotor 30 defined by the inside diameter of the annular plates 31 and corrugations 32. The slots in the partition 22 of the housing 20 are carefully spaced to provide sealing contact with the outer cylindrical surface of the rotor 30 defined by the outside diameter of the annular plates 31 and corrugations 32 along longitudinally extending upper and lower lines designated as 30a and 30b respectively and with the interior cylindrical surface of the rotor along longitudinally extending lines designated as 30c and 30d respectively, while still permitting rotation of the rotor. The exterior surface of the annular endplate 36 of the rotor 30 is in movable, yet substantially sealing, contact with the edge surfaces of the partition 22 which define the depth of the slots therein. The central section 22b of the partition 22 extends through the central opening of the rotor 30 and abuts against the interior surface of the endplate 33 in rotable sealing contact therewith. The partition 22b thus divides the interior chamber of the rotor defined by the inner cylindrical surface 50 into two chambers while the portions 22a and 22c of the partition divide the housing exteriorily of the rotor into two chambers as described more fully hereinafter. The stub shaft 34 on the exterior surface of the endplate 33 of the rotor 30 extends through a bushing 26 in the endplate 25 of the housing 20. Thus, the rotor 30 is rotatable within the housing 20. Due to the close tolerances necessary to provide a seal between the rotor 30 and the partition 22, the rotor 30 is stabilized in position within the housing 20 by a series of three idling rollers 27 and a drive roller 27a, rotatably mounted between the endplates 23 and 25 of the housing 20. The rollers 27 and 27a are circumferentially spaced about the cylindrical rotor 30 in contact with the peripheral surfaces thereof. The majority of the weight of the cylindrical rotor 30 is distributed between the lowermost of the idling rollers 27 and drive roller 27a, thereby relieving much of the strain that would otherwise occur on the bushing 26 of the endplate 25. The uppermost of the rollers 27, acting in conjunction with the lowermost of the rollers, stabilize the cylindrical rotor 30 to permit free rotation while yet maintaining a sealing relationship with the contacting interior surfaces of the housing 20. The drive roller 27a is adapted for rotation through the use of ordinary means such as pulleys or gears, a belt drive being illustrated in FIGURE 5. Rotation of the drive roller 27a causes the rotor to be rotated at a predetermined rate.

The central section 22b of the partition 22 extends into the central opening of the cylindrical rotor, hence, at all times during rotation of the rotor 30, one semi-cylindrical portion of the rotor will be in the chamber A while the other semi-cylindrical portion of the rotor 30 will be in the chamber B. In the embodiment shown, the central section 22b is formed convex-concave toward the chamber A such that the volume of chamber B at the interior of the rotor is larger than chamber A therein.

Mounted to the integral endplate 23 of the housing 20 and longitudinally extending into the chamber A within the space between the central section 22b of the partition 22 and the interior portion of the cylindrical rotor 30 is an elongate header 11 of arcuate cross-section. The header 11 is sealed to the endplate 23 and extends therethrough for connection to a distilland feedpipe. The convex outer surface of the header 11 contains a series of apertures therethrough, the apertures being in general alignment with the radial passageways formed by the corrugations of the spacers 32 of the cylindrical rotor 30. Upon supplying distilland under pressure into the header 11, the distilland will be ejected through the apertures in the header 11 into the chamber A of the housing 20, passing first through the tubular opening defined by the cylindrical rotor 30 and then through the radial passageways formed by the corrugations in the plates 32 of the rotor 30. An outlet 12 is provided in the upper wall of the housing 20 to enable removal of vapor from the chamber A. The lower portion of the chamber A, below the lowermost surface of the cylindrical rotor 30, forms a sump 28 for collection of distilland, drainage of the sump 28 being afforded by an outlet 14. The compartment B is provided with an elongate tubular header 13 positioned adjacent the central section 22b of the partition within the central opening of the cylindrical rotor 30. The header 13 is mounted to the endplate 23 of the housing 20 and extends therethrough for connection to a vapor feedpipe. The lower portion of the chamber B extending below the lowermost surface of the cylindrical rotor 30 provides a condensate sump 29, an outlet 16 permitting removal of the condensate.

In operation, the annular plates 31 and the corrugated spacers 32 of the rotating cylindrical rotor 30 are maintained at a temperature slightly above the boiling point of the distilland. For use in a conversion of sea water, the rotor temperature is maintained at about 217° F. by adjustment of vapor temperature as will become apparent hereinbelow. The sea water distilland is preheated to almost the boiling point (about 212° F.) and the hot sea water injected into chamber A of the housing 20 through a distilland feedpipe connected to the evaporator header 11, the hot distilland becoming vaporized upon contact with the annular plates 31 and the corrugated spacers 32 within the radial passageways therebetween. Due to the rapid rotation of the cylindrical rotor 30, centrifugal force spreads the distilland into a thin film along the rotor surfaces forming the radial passageways, the thin film becoming readily vaporized. The centrifugal force also ejects the vapor and remaining unevaporated distilland into the portion of the chamber A surrounding the rotor 30. The unevaporated liquid collects in the sump 28 at the bottom the the chamber A, this hot salty water then being available for use in a heat exchanger for the preheating of incoming distilland. The vapor within the chamber A is removed from the housing 20 via the outlet 12 and is then compressed to a higher pressure and temperature and reintroduced into the housing 20, the superheated vapor being injected into chamber B via the header 13. Upon being ejected from the header 13 and contacting those portions of the cylindrical rotor within the chamber B, the vapor is condensed, giving up heat to the cooler rotor plates 31 and spacers 32. The temperature of the vapor is adjusted (by control of the pressure) so that for the predetermined speed of rotation of the cylindrical rotor 30, the rotor plates 31 and the spacers 32 will be maintained at the desired temperature of about 217° F. The sweet water formed by condensation of the superheated vapor within the compartment B collects in the condensate sump 29 at the bottom of the compartment and is withdrawn and cooled (preferably by passing it through the hot region of a heat exchanger used to preheat incoming sea water distilland).

In an illustrated embodiment of an evaporator-condenser unit 10, in accordance with the present invention, a rotor interior diameter of 4 feet and a rotor exterior diameter of 10 feet, together with a 300 r.p.m. speed of rotation is utilized to provide a 60 G acceleration force. Hence, the film thickness on the surfaces of the radial passageways of the rotor will be approximately only ¼ of the film thickness at an acceleration of 1 G, and so only one fourth of the heat transfer area is needed.

The annular plates 31 and the corrugated annular spacers 32 of the rotor 30 are constructed of 0.03 inch thick admiralty brass bronze, and the spacing between adjacent plates 31 is about 0.1 inch. To rotate the rotor assembly at the desired speed of about 300 r.p.m. the motor 41 is 1500 horsepower. This unit has a conversion capacity of about 1,000,000 gallons per day. Under such conditions of operation for the conversion of sea water, a vapor temperature of approximately 222° F. will provide the desired rotor temperature of about 217° F. Therefore, the pressure within the compartment B of the housing 20 will be approximately 18 p.s.i. (the compression necessary to raise the temperature of the vapor to approximately 222° F.), and the pressure within the compartment A will be at the prevailing atmospheric pressure. It is apparent that proper operation of the unit depends upon maintenance of the integrity of the seal between the rotor and the housing to thereby enable compartments A and B to be operated under different conditions of atmosphere and temperature.

FIGURE 3 illustrates the use of the rotary evaporator-condenser unit of the present invention in a salt water conversion system. The conversion system includes, in general terms, a first heat exchanger 41, an internal combustion engine 42, a second heat exchanger 43, mounted to the exhaust manifold and cylinder head and cylinder of the engine 42, a compressor 44 driven by the engine 42, and the rotary evaporator-condenser unit 10. The heat exchanger 41 includes a cool region 46 and two separate hot regions 47 and 48. The heat exchanger 43 includes a cool region 49 and its hot region is the exhaust manifold of the internal combustion engine 42.

An inlet pipe 51 is connected to the inlet of the cool region 46 of the heat exchanger 41. The outlet of the cool region 46 of the heat exchanger 41 is connected by a pipe 52 to the inlet of the cool region 49 of the heat exchanger 43. The outlet of the cool region 49 of the heat exchanger 43 is connected by an evaporator feedpipe 53 to the evaporator header 11 in the chamber A of the evaporator-condenser unit 10. A pipe 54 connects the outlet 14 at the bottom of the chamber A to the inlet of the hot region 47 of the heat exchanger 41. An exhaust pipe 56 is connected to the outlet of the hot region 47 of the heat exchanger 41. The outlet 12 in the vapor dome of the chamber A of the evaporator-condenser unit 10 is connected by a pipe 57 to the inlet of the compressor 44. The outlet of the compressor 44 is connected by pipe 58 to the distribution header 13 in the chamber B of the evaporator-condenser unit 10. The outlet 16 in the bottom of the chamber B is connected by a pipe 59 to the inlet of the hot region 48 of the heat exchanger 41. A distribution pipe 61 is connected to the outlet of the hot region 48 of the heat exchanger 41.

In operation, sea water distilland is pumped through the pipe 51 into the cool region 46 of the heat exchanger 41. As the sea water passes through the cool region 46 of the heat exchanger 41, it is heated and then conducted through the pipe 52 to the heat exchanger 43. Upon passage through the cool region 49 of the heat exchanger 43, the sea water is heated still further to approximately its boiling point by the heat given up by the exhaust gases of the engine 42 flowing through the exhaust manifold forming the hot region of the heat exchanger 43. The hot sea water is then conducted through the evaporator feedpipe 53 to the evaporator header 11 in the evaporator-condenser unit 10. Upon being sprayed from the header 11 into the chamber A of the evaporator-condenser unit 10, the sea water is partially vaporized in the above-described manner. That portion of the sea water which fails to vaporize then collects in the sump 28 at the bottom of the chamber A, from whence it is conducted through the pipe 54 to the hot region 47 of the heat exchanger 41. Upon passage of the very salty hot water through the hot region 47, the water gives up heat, which heat is used to preheat the incoming sea water flowing through the cool region 46 of the heat exchanger 41. Upon passage through the hot region 47 of the heat exchanger 41, the very salty water is then exhausted through the exhaust pipe 56.

The vapor that is formed within the chamber A of the housing 20 is conducted to the compressor 44 by the pipe 57. The vapor is compressed, thereby raising its temperature and the heated vapor is then fed from the compressor 44 through the condenser feedpipe 58 to the header 13 within the chamber B of the evaporator-condenser unit 10. Upon injection into the chamber B, the vapor is condensed in the above-described manner, the condensate being collected in the sump 29, from which it is passed through a pipe 59 to the hot region 48 of the heat exchanger 41. Upon passage of the hot condensate through the hot region 48 of the heat exchanger 41, the condensate is cooled, the heat given up thereby serving to preheat the incoming sea water distilland passing through the cool region 46 of the heat exchanger 41. Upon leaving the hot region 48 of the heat exchanger 41, the cool condensate in the form of sweet water is passed through the distribution pipe 61 and thereby removed from the system.

Thus, there has been described novel rotary evaporator-condenser apparatus for the distillation of liquids, the structure of the apparatus providing efficient heat transfer to thereby result in a relatively compact and inexpensive distillation system. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A rotary evaporator-condenser apparatus comprising, in combination: a sealed housing; a cylindrical tubular rotor rotatably mounted within said housing for rotation about its longitudinal axis, said rotor comprising a series of spaced annular fins disposed in coaxial alignment and defining a plurality of radially extending openings between adjacent fins; partitioning means within said housing extending longitudinally therethrough, said partitioning means being contiguous with the exterior cylindrical surface of said rotor along two spaced-apart longitudinally extending lines on the exterior surface of said rotor and with the interior cylindrical surface of said rotor along two spaced-apart longitudinally extending lines on the interior cylindrical surface of said rotor, the contiguity between said partitioning means and the exterior surfaces of said rotor providing an effective pressure seal therebetween while still permitting rotation of said rotor, said partitioning means longitudinally dividing said housing into first and second chambers wth semi-tubular portions of said rotor extending into both of said chambers; drive coupling means extending into said housing, said drive coupling means being adapted upon coupling to a source of driving power to rotate said rotor at a predetermined speed; first header means extending into said first chamber of said housing within the central opening of said tubular rotor for injecting a liquid distilland into the radially extending openings in said rotor; a first outlet extending into said housing and communicating with the upper portion of said first chamber for the removal of vaporized distilland from said first chamber; a second outlet extending into said housing and communicating with the lowermost portion of said first chamber for the removal of liquid distilland from said first chamber; second header means extending into said second chamber of said housing within the central opening of said tubular rotor for injecting vaporized distilland into the radially extending openings in said rotor; a third outlet extending into said housing and communicating with the lowermost portion of said second chamber for the removal of liquid condensate from said second chamber; means for heating said distilland; means for conducting said distilland from said heater to said first header means; and, vapor compression means connected between said first outlet and said second header.

2. A rotary evaporator-condenser apparatus comprising, in combination: a sealed housing; a cylindrical tubular rotor rotatably mounted within said housing for rotation about its longitudinal axis, said rotor comprising a series of spaced annular fins disposed in coaxial alignment and defining a plurality of radially extending openings between adjacent fins; a partitioning wall within said housing, said partitioning wall extending inward from opposing interior surfaces of said housing, said partitioning wall being contiguous with the exterior cylindrical surface of said rotor along two spaced-apart longitudinally extending lines on the exterior surface of said rotor and with the interior cylindrical surface of said rotor along two spaced-apart longitudinally extending lines on the interior cylindrical surface of said rotor, the contiguity between said partitioning wall and the exterior surfaces of said rotor providing an effective pressure seal therebetween while still permitting rotation of said rotor, said partitioning wall longitudinally dividing said housing into first and second chambers with portions of said rotor extending into both of said chambers; drive coupling means extending into said housing, said drive coupling means being adapted upon coupling to a source of driving power to rotate said rotor at a predetermined speed; first header means extending into said first chamber of said housing within the central opening of said tubular rotor for injecting a liquid distilland into the radially extending openings in said rotor; a first outlet extending into said housing and communicating with the upper portion of said first chamber for the removal of vaporized distilland from said first chamber; a second outlet extending into said housing and communicating with the lowermost portion of said first chamber for the removal of liquid distilland from said first chamber; second header means extending into said second chamber of said housing within the central opening of said tubular rotor for injecting vaporized distilland into the radially extending openings in said rotor; and a third outlet extending into said housing and communicating with the lowermost portion of said second chamber for the removal of liquid condensate from said second chamber.

3. A rotary evaporator-condenser apparatus comprising, in combination: a sealed housing having a longitudinally extending semi-cylindrical upper surface; a cylindrical tubular rotor longitudinally mounted within said housing with its longitudinal axis in horizontal alignment with the longitudinal axis of said housing, said rotor comprising a series of spaced annular fins disposed in coaxial alignment and defining a plurality of radially extending openings between adjacent fins; a longitudinal partitioning wall within said housing, said partitioning wall extending inwardly from the bottom and curved top interior surfaces of said housing, said partitioning wall being contiguous with the exterior cylindrical surface of said rotor along two spaced-apart longitudinally extending lines on the exterior surface of said rotor, said partitioning wall having a segment extending throughout the central opening of said tubular rotor and contiguous with the interior cylindrical surface of said rotor along two spaced-apart longitudinally extending lines on the interior cylindrical surface of said rotor, the contiguity between said partitioning wall and the cylindrical surfaces of said rotor providing an effective pressure seal therebetween while still permitting rotation of said rotor, said partitioning wall longitudinally dividing said housing into said first and second chambers with portions of said rotor extending into both of said chambers; drive coupling means extending into said housing, said drive coupling means being adapted upon coupling to a source of driving power to rotate said rotor at a predetermined speed; first header means extending into said first chamber of said housing within the central opening of said tubular rotor for injecting a liquid distilland into the radially extending openings in said rotor, the point of injection for said liquid distilland and the speed of said rotor being such that substantially all of said distilland is ejected from said rotor within said first chamber; a first outlet extending into said housing and communicating with the upper portion of said first chamber for the removal of vaporized distilland from said first chamber; a second outlet extending into said housing and communicating with the lowermost portion of said first chamber for the removal of liquid distilland from said first chamber; second header means extending into said second chamber of said housing within the central opening of said tubular rotor for injecting vaporized distilland into the radially extending openings in said rotor; and a third outlet extending into said housing and communicating with the lowermost portion of said second chamber for the removal of liquid condensate from said second chamber.

4. A rotary evaporator-condenser apparatus comprising, in combination: a sealed housing having a longitudinally extending semi-cylindrical upper surface; a cylindrical tubular rotor longitudinally mounted within said housing with its longitudinal axis in horizontal alignment with the longitudinal axis of said housing, said rotor comprising a series of spaced annular fins disposed in coaxial alignment and defining a plurality of radially extending openings between adjacent fins; a longitudinal partitioning wall with said housing, said partitioning wall extending inwardly from the bottom and curved top interior surfaces of said housing, said partitioning wall being contiguous with the exterior cylindrical surface of said rotor along two spaced-apart longitudinally extending lines on the exterior surface of said rotor, said partitioning wall having a segment extending throughout the central opening of said tubular rotor and contiguous with the interior cylindrical surface of said rotor along two spaced-apart longitudinally extending lines on the interior cylindrical surface of said rotor, the contiguity between said partitioning wall and the cylindrical surfaces of said rotor providing an effective pressure seal therebetween while still permitting rotation of said rotor, said partitioning wall longitudinally dividing said housing into said first and second chambers with portions of said rotor extending into both of said chambers; a plurality of rollers longitudinally horizontally extending through said housing for rotation therein about their longitudinal axes, said rollers being spaced about the exterior cylindrical surface of said cylindrical rotor and in bearing contact therewith, one of said rollers being adapted upon coupling to a source of driving power to rotate said rotor at a predetermined speed; first header means extending into said first chamber of said housing within the central opening of said tubular rotor for injecting a liquid distilland into the radially extending openings in said rotor, the point of injection for said liquid distilland and the speed of said rotor being such that substantially all of said distilland is ejected from said rotor within said first chamber; a first outlet extending into said housing and communicating with the upper portion of said first chamber for the removal of vaporized distilland from said first chamber; a second outlet extending into said housing and communicating with the lowermost portion of said first chamber for the removal of liquid distilland from said first chamber; second header means extending into said second chamber of said housing within the central opening of said tubular rotor for injecting vaporized distilland into the radially extending openings in said rotor; and a third outlet extending into said housing and communicating with the lowermost portion of said second chamber for the removal of liquid condensate from said second chamber; means for heating said distilland; means for conducting said distilland from said heater to said first header means; and, vapor compression means connected between said first outlet and said second header means.

5. A rotary evaporator-condenser apparatus comprising, in combination: a sealed housing; a cylindrical tubular rotor rotatably mounted within said housing for rotation about its longitudinal axis, said rotor comprising an alternate series of flat annular plates and corrugated annular fins disposed in coaxial alignment, the corrugated fins defining a plurality of radially extending openings between adjacent plates; a partitioning wall within said housing, said partitioning wall extending inward from opposing interior surfaces of said housing, said partitioning wall being contiguous with the exterior cylindrical surface of said rotor along two spaced-apart longitudinally extending lines and with the interior cylindrical surface of said rotor along two spaced-apart longitudinally extending lines, the contiguity between said partitioning wall and the cylindrical surfaces of said rotor providing an effective pressure seal therebetween while still permitting rotation of said rotor, said partitioning wall longitudinally dividing said housing into first and second chambers with portions of said rotor extending into both of said chambers; drive coupling means extending into said housing, said drive coupling means being adapted upon coupling to a source of driving power to rotate said rotor at a predetermined speed; first header means extending into said first chamber of said housing within the central opening of said tubular rotor for injecting a liquid distilland into the radially extending openings in said rotor, the point of injection for said liquid distilland and the speed of said rotor being such that substantially all of said distilland is ejected from said rotor within said first chamber; a first outlet extending into said housing and communicating with the upper portion of said first chamber for the removal of vaporized distilland from said first chamber; a second outlet extending into said housing and communicating with the lowermost portion of said first chamber for the removal of liquid distilland from said first chamber; second header means extending into said second chamber of said housing within the central opening of said tubular rotor for injecting vaporized distilland into the radially extending openings in said rotor; and a third outlet extending into said housing and communicating with the lowermost portion of said second chamber for the removal of liquid condensate from said second chamber.

6. A rotary evaporator-condenser apparatus comprising, in combination: a sealed housing; a cylindrical rotor rotatably mounted within said housing for rotation about its longitudinal axis, said rotor comprising a series of spaced fins disposed in coaxial alignment and defining a plurality of radially extending openings between adjacent fins; partitioning means within said housing, said partitioning means being contiguous with the exterior cylindrical surface of said rotor along two spaced-apart longitudinally extending lines on the exterior surface of said rotor, the contiguity between said partitioning means and the cylindrical surface of said rotor providing an effective pressure seal therebetween while still permitting rotation of said rotor, said partitioning means longitudinally dividing said housing into first and second chambers with portions of said rotor extending into both of said chambers; drive coupling means extending into said housing, said drive coupling means being adapted upon coupling to a source of driving power to rotate said rotor as a predetermined speed; first header means extending into said first chamber of said housing for injecting a liquid distilland into the radially extending openings in said rotor; means for injecting said liquid distilland at a temperature just below the boiling point thereof; a first outlet extending into said housing and communicating with the upper portion of said first chamber for the removal of vaporized distilland from said first chamber; a second outlet extending into said housing and communicating with the lowermost portion of said first chamber for the removal of liquid distilland from said first chamber; second header means extending into said second chamber of said housing for injecting vaporized distilland into the radially extending openings in said rotor; means for super heating said vaporized distilland prior to injection to a temperature substantially above the boiling point of said liquid distilland, said temperature being sufficient to maintain said rotor at a temperature above the boiling point of said liquid distilland; and a third outlet extending into said housing and communicating with the lowermost portion of said second chamber for the removal of liquid condensate from said second chamber.

7. A rotary evaporator-condensate apparatus comprising, in combination: a sealed housing; a cylindrical tubular rotor rotatably mounted within said housing for rotation about its longitudinal axis, said rotor comprising a series of spaced annular fins defining a plurality of radially extending openings between adjacent fins; a partitioning wall within said housing, said partitioning wall extending inward from opposing interior surfaces of said housing, said partitioning wall being contiguous with the exterior cylindrical surface of said rotor along two spaced-apart longitudinally extending lines on the exterior surface of said rotor, the contiguity between said partitioning wall and the cylindrical surfaces of said rotor providing an effective pressure seal therebetween while still permitting rotation of said rotor, said partitioning wall longitudinally dividing said housing into first and second chambers with portions of said rotor extending into both of said chambers; drive coupling means extending into said housing, said drive coupling means being adapted upon coupling to a source of driving power to rotate said rotor at a predetermined speed; liquid injection means extending into said first chamber of said housing for injecting a liquid distilland into the radially extending openings in said rotor; means for heating said liquid distilland prior to injection; a first outlet extending into said housing and communicating with the upper portion of said first chamber for the removal of vaporized distilland from said first chamber; a second outlet extending into said housing and communicating with the lowermost portion of said first chamber for the removal of liquid distilland from said first chamber; second header means extending into said second chamber of said housing within the central opening of said tubular rotor for injecting vaporized distilland into the radially extending openings in said rotor; means for compressing said vaporized distilland to raise the temperature thereof to a second temperature substantially above the boiling point of said liquid distilland, said second temperature being such that said rotor is maintained at a third temperature intermediate said first and second temperatures but above the boiling point of said liquid distilland; and a third outlet extending into said housing and communicating with the lowermost portion of said second chamber for the removal of liquid condensate from said second chamber.

8. A rotary evaporator-condenser apparatus comprising, in combination:
   a sealed housing;
   a cylindrical rotor rotatably mounted within said housing for rotation about its longitudinal axis, said rotor comprising a series of spaced fins defining a plurality of radially extending openings between adjacent fins;
   partitioning means within said housing extending longitudinally therethrough, said partitioning means being contiguous with the exterior cylindical surface of said rotor along two spaced-apart longitudinally extending lines on the exterior surface of said rotor, the contiguity between said partitioning means and the surfaces of said rotor providing an effective pressure seal therebetween while still permitting rotation of said rotor, said partitioning means longitudinally dividing said housing into first and second chambers with portions of said rotor extending into both of said chambers;
   drive coupling means extending into said housing, said drive coupling means being adapted upon coupling to a source of driving power to rotate said rotor at a predetermined speed;

first header means extending into said first chamber of said housing for injecting a liquid distilland into the radially extending openings in said rotor;

a first outlet extending into said housing and communicating with the upper portion of said first chamber for the removal of vaporized distilland from said fiirst chamber;

a second outlet extending into said housing and communicating with the lowermost portion of said first chamber for the removal of liquid distilland from said first chamber;

second header means extending into said second chamber of said housing within the central opening of said tubular rotor for injecting vaporized distilland into the radially extending openings in said rotor; and a third outlet extending into said housing and communicating with the lowermost portion of said second chamber for the removal of liquid condensate from said second chamber.

9. A rotary evaporator-condenser apparatus comprising, in combination:

a sealed housing;

a cylindrical rotor rotatably mounted within said housing for rotation about its longitudinal axis, said rotor comprising a series of spaced fins defining a plurality of radially extending openings between adjacent fins;

a partitioning wall within said housing, said partitioning wall extending inward from opposing interior surfaces of said housing, said partitioning wall being contiguous with the exterior cylindrical surface of said rotor along two spaced-apart longitudinally extending lines on the exterior surface of said rotor and with the interior cylindrical surface of said rotor along two spaced-apart longitudinally extending lines on the interior cylindrical surface of said rotor, the contiguity between said partitioning wall and the exterior surface of said rotor providing an effective pressure seal therebetween while still permitting rotation of said rotor, said partitioning wall longitudinally dividing said housing into first and second chambers with portions of said rotor extending into both of said chambers;

drive coupling means extending into said housing, said drive coupling means being adapted upon coupling to a source of driving power to rotate said rotor at a predetermined speed;

means extending into said first chamber of said housing for injecting a liquid distilland into the radially extending openings in said rotor;

a first outlet extending into said housing and communicating with the upper portion of said first chamber for the removal of vaporized distilland from said first chamber;

a second outlet extending into said housing and communicating with the lowermost portion of said first chamber for the removal of liquid distilland from said first chamber;

means extending into said second chamber of said housing for injecting vaporized distilland into the radially extending openings in said rotor; and a third outlet extending into said housing and communicating with the lowermost portion of said second chamber for the removal of liquid condensate from said second chamber.

References Cited by the Examiner

UNITED STATES PATENTS

| 1,396,232 | 11/21 | Pflugfelder | 202—236 |
| 2,484,445 | 10/49 | Bibby | 202—236 |
| 2,999,796 | 9/61 | Bromley | 202—236 |

FOREIGN PATENTS

| 1,143,052 | 9/57 | France. |

NORMAN YUDKOFF, *Primary Examiner.*

ANTHONY SCIAMANNA, *Examiner.*